United States Patent
Henson et al.

(10) Patent No.: US 6,440,482 B1
(45) Date of Patent: Aug. 27, 2002

(54) BEVERAGES CONTAINING MIXED SODIUM-POTASSIUM POLYPHOSPHATES

(75) Inventors: Lulu S. Henson, Plainsboro; Darlene A. Marcolini, Lawrence Township, both of NJ (US)

(73) Assignee: Astaris, LLC, St. Louis, MI (US)

( * ) Notice: Subject to any disclaimer, the term of this patent is extended or adjusted under 35 U.S.C. 154(b) by 0 days.

(21) Appl. No.: 09/990,674

(22) Filed: Nov. 16, 2001

Related U.S. Application Data

(62) Division of application No. 09/603,181, filed on Jun. 26, 2000.
(60) Provisional application No. 60/141,330, filed on Jun. 28, 1999.

(51) Int. Cl.⁷ ............................. A23C 9/30; A23L 2/44
(52) U.S. Cl. ................. 426/590; 426/330.3; 426/335; 426/532; 426/599
(58) Field of Search ................. 426/590, 599, 426/330.3, 335, 532

(56) References Cited

U.S. PATENT DOCUMENTS

| | | | |
|---|---|---|---|
| 2,370,472 A | 2/1945 | King | 252/1 |
| 2,557,109 A | 6/1951 | Iler et al. | 23/107 |
| 2,874,027 A | 2/1959 | Gloss | 23/107 |
| 2,904,513 A | 9/1959 | Metcalf | 252/135 |
| 2,906,599 A | 9/1959 | Roland | 23/42 |
| 2,929,715 A | 3/1960 | Sutton | 99/14 |
| 2,948,588 A | 8/1960 | Baumann | 23/106 |
| 2,988,439 A | 6/1961 | Gloss | 71/1 |
| 3,052,549 A | 9/1962 | Kichline et al. | 99/95 |
| 3,081,150 A | 3/1963 | Beltz et al. | 23/106 |
| 3,168,373 A | 2/1965 | Hartlapp et al. | 23/106 |
| 3,179,524 A | 4/1965 | Hunter | 106/39 |
| 3,455,649 A | 7/1969 | Bigot | 23/107 |
| 4,431,679 A | 2/1984 | Crawford | 426/332 |
| 4,737,375 A | 4/1988 | Nakel et al. | 426/590 |
| 5,302,363 A | 4/1994 | Highfill et al. | 423/315 |
| 5,417,994 A | 5/1995 | Chang et al. | 426/330.3 |
| 5,431,940 A | 7/1995 | Calderas et al. | 426/330.3 |
| 5,641,015 A | 6/1997 | Challand | 164/528 |
| 5,641,532 A | 6/1997 | Pflaumer et al. | 426/590 |
| 5,792,502 A | 8/1998 | Montezinos | 426/590 |
| 5,919,512 A | 7/1999 | Montezinos | 426/590 |
| 6,126,980 A | 10/2000 | Smith et al. | 426/330.3 |

FOREIGN PATENT DOCUMENTS

| | | | |
|---|---|---|---|
| EP | 0108685 | 5/1984 | 25/41 |

OTHER PUBLICATIONS

Phosphorus and Its Compounds, Author John R. Van Wazer, vol. I, Assistant Research Director and Senior Scientist, Inorganic Chemicals Division, Monsanto Chemical Company, St. Louis, Missouri published 1958, Interscience Publishers, Inc., New York; Interscience Ltd., London.

*Primary Examiner*—Helen Pratt
(74) *Attorney, Agent, or Firm*—Ahaji K. Amos; Thomas Coburn LLP

(57) ABSTRACT

A beverage containing a mixed sodium potassium polyphosphate glass with a high potassium to sodium ratio and a low level of insoluble material is provided. The mixed sodium-potassium polyphosphate glass has the formula $(K,Na)_{(n+2)}O(PO_3)_n$, and contains less than 10% by weight insoluble material. These materials are effective in controlling yeast, mold, and bacterial growth. The beverage comprises about 100 ppm to about 3000 ppm of a polyphosphate.

17 Claims, No Drawings

BEVERAGES CONTAINING MIXED SODIUM-POTASSIUM POLYPHOSPHATES

CROSS-REFERENCE TO RELATED APPLICATIONS

This is a divisional of U.S. patent application Ser. No. 09/603,181, filed Jun. 26, 2000, which claims priority under 35 U.S.C. §119(e) to U.S. provisional patent application No. 60/141,330, filed Jun. 28, 1999.

FIELD OF THE INVENTION

This invention relates to polyphosphates and to methods for their preparation. In particular, this invention relates to polyphosphates with a high potassium to sodium ratio, which are useful in the preparation of low sodium beverages as well as meat and other food products in which sodium reduction is desired.

BACKGROUND OF THE INVENTION

Many beverages provide an excellent environment for rapid microbial growth because microorganisms can rapidly proliferate by feeding on nutrients present in the beverage. Fruit juice, for example, an important component of many beverages, provides an excellent medium for the growth of microorganisms. Consequently, controlling microbial growth in packaged beverages, especially those that are stored under ambient conditions, is an ongoing concern among beverage manufacturers.

Although beverages can be maintained under ambient conditions if they are heat pasteurized during packaging (hot packing) or are packaged under completely aseptic conditions (aseptic packaging), not all beverages can packaged by these methods. Hot packing, which involves heating the beverage and its container to a temperature between about 85–105° C. during packaging so that the resulting sealed beverage contains no food spoilage microorganism, is unsuitable for manufacturing certain types of beverages. Hot packaging is commonly used in the manufacture of beverages that are canned or bottled in glass containers, but flexible containers made from high density polyethylene, for example, cannot be subjected to the temperatures used during hot packing operations. Although packaging under completely aseptic conditions produces a beverage free of food spoilage microorganisms, aseptic packaging methods are often unsuitable for manufacturing beverages packaged in certain beverage containers, e.g., rigid containers such as glass and cans.

In addition, a sterile environment is difficult to maintain during the packaging operation. Frequent cleaning of the packaging line, which is time consuming, expensive, and frequently ineffective in preventing microbial contamination, is necessary.

Because these methods cannot be used for all types of beverages and because these methods sometimes do not produce a beverage that is free of microorganisms, preservatives, such as sorbates, benzoates, and organic acids, are often added to inhibit microbial proliferation.

However, when used at the levels necessary to inhibit subsequent microbial proliferation at ambient temperatures, preservatives often contribute an off-flavor to the beverages. But, when used at concentrations sufficiently low to avoid an off-flavor, preservatives are generally unable to effectively inhibit the growth of many food spoilage microorganisms.

Sodium salts of phosphoric acid derivatives, especially food grade sodium hexametaphosphate, have been used with preservatives to enhance the potency of preservatives so that lower levels can be used, thus improving taste. Calderas, U.S. Pat. No. 5,431,940, incorporated herein by reference, for example, discloses the use of polyphosphates in combination with sorbate preservatives in dilute juice beverages having relatively low water hardness.

However, addition of sodium salts to beverages increases their sodium content and makes them unacceptable to users who require a low sodium beverage. Commercially available potassium polyphosphate salts, often collectively referred to as "potassium Kurrol's salt," are highly polymerized, crystalline polyphosphates, typically containing 400 to 20,000 polyphosphates units. Although these materials contain high levels of potassium, they are not acceptable for beverage applications because they contain large amounts of insoluble material. Thus, a need exists for polyphosphate salts that contain a high potassium to sodium ratio and a low level of insoluble material and are effective in controlling microorganisms.

SUMMARY OF THE INVENTION

In one embodiment the invention, a beverage containing a mixed sodium potassium polyphosphate glass with a high potassium to sodium ratio and a low level of insoluble material is provided. The mixed sodium-potassium polyphosphate glass has the formula $(K,Na)_{(n+2)}O(PO_3)_n$, and contains less than 10% by weight insoluble material. These materials are effective in controlling yeast and mold growth. The beverage comprises about 100 ppm to about 3000 ppm of a polyphosphate.

DETAILED DESCRIPTION OF THE INVENTION

High Potassium Polyphosphate

Long chain polyphosphates in which the sodium to potassium ratio is 0.5 to 3.8 and in which n is greater than 10 are effective in controlling microorganisms and have sufficient solubility to be useful in beverage applications. These materials can be used to decrease sodium content of beverages, making them more acceptable to users who require a low sodium beverage.

In the following description "M" represents potassium, sodium, or a mixture of potassium and sodium. (K,Na) represents a mixture of potassium and sodium. Those skilled in the art will recognize that in phosphate salts these components are mono-positively charged ions. For example, $MH_2PO_4$ represents monopotassium phosphate ($KH_2PO_4$), monosodium phosphate $NaH_2PO_4$), or a mixture of these materials; and MOH represents potassium hydroxide, sodium hydroxide, or a mixture of these materials, i.e., (K,Na)OH.

The polyphosphate has the following composition:

$$(K,Na)_{(n+2)}O(PO_3)_n \qquad (I)$$

the ratio of potassium to sodium is about 0.5 to 3.8, preferably 1.0 to 3.8, more preferably 2.4 to 3.6;

the average value of n is greater than 10; and at least 85% of the phosphate species comprise more than three phosphate units.

The polyphosphate contains less than 10% by weight, preferably less than 5% by weight, a material that is insoluble in aqueous solution (i.e., material that is not soluble in cold water). A 1% solution of the polyphosphate in water has a pH of about 7.0 to about 7.2. X-ray analysis indicates that the polyphosphate is amorphous. In dilute aqueous solution (1%) the polyphosphate is as stable to hydrolytic degradation as sodium polyphosphate.

The ratio of potassium to sodium is about 0.5 to 3.8, preferably 1.0 to 3.8, and more preferably 2.4 to 3.6. Above a potassium to sodium ratio of 3.8, excess insolubles, which make the material unacceptable for use in beverage applications, are present.

The average number of polyphosphate units, n, is greater than 10, preferably greater than 12, and up to about 100.

Preparation of aqueous solutions of mixed polyphosphates by ion exchange is described in Iler, U.S. Pat. No. 2,557,109. However, this process produces an aqueous solution, not a glassy solid.

The glassy mixed polyphosphate of this invention can be prepared by the following reaction:

A mixture of monopotassium, phosphate, monosodium phosphate, and potassium and/or sodium hydroxide is prepared. The potassium/sodium ratio of the mixture should be the same ratio that is desired in the glassy polyphosphate product. Preferably, no ions other than sodium, potassium, the ions derived from phosphate (i.e., $H_2PO_4^-$, $HPO_4^{-2}$, $PO_4^{-3}$), and optionally, hydroxide, are present. If desired, water may also be added to the mixture. For the preparation of polyphosphates for use in beverage applications, food grade materials are preferred.

The (K,Na)/P ratio should be between 1.0 and 1.6, and is adjusted for the desired value of n. The smaller the value of this ratio, i.e. the closer this value is to 1.00, the higher the average value of n.

As will be obvious to those skilled in the art, a mixture containing the appropriate amounts of potassium ions, sodium ions, and phosphate ions can be obtained by partially or completely replacing one or more of these components with other materials, such as phosphoric acid, dipotassium phosphate, disodium phosphate, tripotassium phosphate, trisodium phosphate, etc. Phosphoric acid in which the phosphate is already partially polymerized, i.e., 115% phosphoric acid, etc., may also be used. For example, an appropriate mixture could be prepared from monopotassium phosphate, monosodium phosphate, and dipotassium phosphate; from phosphoric acid, sodium hydroxide, and potassium hydroxide; etc. Partially polymerized phosphates, i.e., pyrophosphates and higher phosphates may also be used as starting materials, but are not preferred. All these methods are equivalent methods of forming the mixture described above.

The mixture is placed in a vessel that can withstand the heating conditions, such as a ceramic or alumina vessel, and heated in an appropriate apparatus, such as a muffle furnace. On an industrial scale, the process may be carried out in a bigger furnace, e.g., 8 feet (about 2.4 M) wide by 15 feet (about 4.6 M) long, lined with zircon ramming mix on the bottom designed to withstand a melt temperature of at least 800° C.

The mixture is heated at about 750° C. to drive off water and to form a clear melt. Heating below 600° C. produces materials with insufficient long-chain (n>3) phosphate species. Heating at 780° C. produces material that contains excessive insolubles or difficultly-soluble material that is unacceptable for beverage applications. Heating should be carried out for about 0.75 to about 1.5 hr. Heating to the required temperature can be carried out in one step or in several stages. After heating, the reaction mixture containing the polyphosphate is, preferably, rapidly cooled so that no crystal growth occurs.

The product is a mixed sodium-potassium polyphosphate glass of formula $(K,Na)_{(n+2)}O(PO_3)_n$. The polyphosphate glass contains less than 10% by weight insoluble material.

Beverages

The preparation of beverages and the materials used therein is well known to those skilled in the art and has been described in numerous patents and publications, such as, Nakel, U.S. Pat. No. 4,737,375, which emphasizes the preparation of carbonated beverages; Calderas, U.S. Pat. No. 5,431,940, and Pflaumer, U.S. Pat. No. 5,641,532, both of which emphasize the preparation of non-carbonated juice beverages. All three of these patents are incorporated herein by reference.

Beverages can be prepared by making a beverage concentrate, adding to it a sugar syrup containing the polyphosphate of this invention, including the acidulants, preservatives, and water in amounts sufficient to obtain the desired beverage composition. The concentrate is prepared by admixing a dispersion of the flavor oil in ester gum and a dispersion of a hydrocolloid such as gum acacia in water, then homogenizing to form a stable emulsion of the flavor oil. Aside from providing the desired flavor, this emulsion also serves to add opacity and texture to the beverage. Other suitable oils may be added to the concentrate to increase opacity. Preservatives, acidulants, and coloring material may also be added to the concentrate. The sugar syrup is prepared separately by mixing sugar syrup such as high fructose corn syrup with water, then adding to it any optional water soluble vitamins, the polyphosphate, acidulants, and preservatives. The sugar syrup and concentrate are combined to form a non-carbonated beverage. It can then be packaged and stored.

Polyphosphates are effective in inhibiting the growth of microorganisms in non-carbonated beverages when present in the beverage at about 100 ppm to about 3000 ppm, typically about 300 ppm to 3000 ppm, preferably about 500 ppm to about 1500 ppm, and more preferably about 1000 ppm.

Non-carbonated beverages may comprise 0.1 to 40%, preferably 1 to 20%, and more preferably 2% to 10%, and most preferably 3% to 6% fruit juice (weight percentage based on single strength 1–16° Brix fruit juice). The juice may be any citrus juice, non-citrus juice, or a mixture thereof, which is known for use in non-carbonated beverage. Non-fruit juices, such as vegetable or botanical juices, and tea solids also can be used in non-carbonated beverages. When tea solids are used, the non-carbonated beverage typically comprises preferably about 0.02 to about 0.25%, more preferably about 0.07% to about 0.15%, by weight of tea solids. The term "tea solids" as used herein means solids extracted from tea materials including those materials obtained from the genus Camellia, including *C. sinensis* and *C. assaimica*.

Non-carbonated beverages have a pH of from about 2.5 to about 4.5, preferably from about 2.7 to about 4.0. This pH range is typical for non-carbonated dilute juice beverage products. Beverage acidity can be adjusted to and maintained within the requisite range by known and conventional methods, e.g., the use of food grade acid buffers. Typically, beverage acidity is a balance between maximum acidity for microbial inhibition and optimum acidity for the desired beverage flavor and sourness impression.

Non-carbonated beverages typically contain an artificial or natural, caloric or noncaloric, sweetener. Preferred are carbohydrate sweeteners, more preferably mono- and or disaccharide sugars, such as maltose, sucrose, glucose, fructose, invert sugars and mixtures thereof. The non-carbonated beverage products typically comprise from about 0.1% to about 20%, more preferably from about 6% to about 14%, sugar solids by weight of the beverage products. Optional artificial or noncaloric sweeteners include, for example, saccharin, cyclamates, acetosulfam, L-aspartyl-L-phenylalanine lower alkyl ester sweeteners (e.g., aspartame), and the like. The sweetener can be provided to some extent by the other components, such as the fruit juice.

Non-carbonated beverages may also comprise any other ingredient or ingredients typically used as optional beverage ingredients, such as flavorants, preservatives (e.g., organic acids), colorants and so forth. Preservatives commonly used in beverage products include, for example, sorbates, benzoates, organic acids, and combinations thereof. Preferred preservatives are sorbic acid, benzoic acid, alkali metal salts thereof, and mixtures thereof. Typically about 400 ppm to about 1000 ppm, more typically about 650 ppm to about 750 ppm, of preservative is added to the beverage, but use of the antimicrobial long chain polyphosphate of this invention in the beverage will allow this amount to be reduced.

Non-carbonated beverages may contain up to 110% of the U.S. Recommended Daily Allowance (RDA) of vitamins and minerals, provided that such vitamins and minerals are chemically and physically compatible with the essential elements of the non-carbonated beverage products and do not cause the growth of microorganisms. Preferred are vitamin A, provitamins thereof (e.g., β-carotene), and ascorbic acid. However, calcium, iron and magnesium fortification should be avoided since these polyvalent cations can bind to and inactive the polyphosphates. Gums, emulsifiers and oils, such as guar gum, xanthan, alginates, mono- and di-glycerides, lecithin, pectin, pulp, cottonseed oil, vegetable oil, food starches, and weighting oils/agents, as well as esters and other flavor and essence oils may also be included.

The balance of the beverage is added water. Added water does not include the water incidentally included in the beverage by other added materials, such as fruit juice or sugar syrup. Although the high potassium polyphosphate of this invention can be used with added water of any hardness typically used to prepare beverages, the added water typically comprises 0 to about 180 ppm hardness.

Meat Products

Phosphates, such as sodium tripolyphosphate, are added to meat, poultry, and seafood to improve its functional properties, particularly its moisture retention. In addition, this prevents a decrease in nutritional value by retaining soluble proteins, minerals, and vitamins. Glassy sodium polyphosphates, also known as sodium hexametaphosphates, are commonly used with sodium tripolyphosphate for the preparation of various muscle foods such as ham, bacon, and luncheon meats. Muscle foods refers to meat products derived primarily from the animal muscle (bovine, porcine, or seafood).

In the preparation of these muscle foods, the common method is to prepare a brine or pickle comprising water, salt (i.e., sodium chloride), 1% to 5% by weight phosphate, and optionally, ingredients such as nitrite or nitrate if the food is a cured product; carbohydrates in the form of, such as, corn syrup solids, dextrose, or sucrose; gums or starches, such as carrageenan, corn starch, potato starch; and proteins, such as soy isolates or concentrates. Typically, about 10% to 50% by weight of brine solution, based on the weight of the muscle food before addition of the brine solution, is added to the muscle food.

It is recommended that the phosphate be dissolved in the water first. Salt is usually added after the phosphate is completely dissolved, followed by the rest of the ingredients. After the brine or pickle is prepared, it is generally cooled to about 40° F. (about 4° C.) or lower before being introduced to the muscle. Typically, the concentration of salt in the brine is adjusted so that the concentration of salt in the final muscle food product will be about 0.8% to about 2.5% by weight. Introduction to the muscle may be achieved either through injection machines or by mixing directly with the muscle in a tumbler or mixer.

In the process of cooling the brine or pickle, salt and phosphates may precipitate out if the brine or pickle is especially concentrated and if the water used has a high level of hardness. Similarly, storing the brine or pickle at room temperature over an extended period of time can trigger premature precipitation of the salt or phosphate. The addition of the glassy sodium polyphosphate to the brine or pickle either by itself or as one of the components of a phosphate blend ensures that the brine or pickle does not precipitate prior to being added to the muscle. High potassium polyphosphate can be used in place of the sodium polyphosphate to reduce the amount of sodium added with the phosphate. Various levels of brines or pickles may be added to the muscle, however, for the purpose of keeping brines stable, 0.1% to 0.5% by weight polyphosphate with a chain length greater than or equal to 6 is required in the brine. Alternatively, the phosphate may be a polyphosphate of formula I above.

Other Food Products

The high potassium polyphosphate can be used to produce a reduced sodium food in any other food application in which phosphates are normally used. These applications include, for example: imitation dairy products, such as non-dairy creamers, whipped toppings, and frozen desserts; dairy products, such as milk, cream, cheese, whey, and ice cream; egg whites; dried and canned fruit; jellies and jams; and gums, such as carrageenan. Food applications of polyphosphates are summarized below.

| Food Uses of Sodium Hexametaphosphate | | |
|---|---|---|
| Product | Major phosphate function | Suggested Use Level, % |
| Dairy Products, imitation | | |
| Non-dairy creamers | Emulsification | 0.1–1.0 |
| Frozen desserts & whipped toppings | Stabilization | 0.2 |
| Sour cream | Prevent syneresis | As required |
| Milk Products | | |
| Cream | Stabilization | As required |
| Beverages | | |
| Milk-based beverages | Stabilization | 0.05–0.2 |
| Fruit beverages | Extends shelf life | 0.1 |

| Food Uses of Sodium Hexametaphosphate | | |
|---|---|---|
| Product | Major phosphate function | Suggested Use Level, % |
| Eggs | | |
| Egg whites (dried) | Improves whipping and foam stability | 2.5 |
| Marshmallows | Improves whipping and foam stability | 0.5 |
| Ice cream | | |
| Hard, soft and imitation | Prevents "churning" | 0.2 |
| Process cheese | Emulsification, controls melt | 0.5 (legal limit is 3%) |
| Meat & poultry | Stabilizes brine & reduces nitrosoamine formation | 0.5, max. |
| Fruit & Vegetables | | |
| Dried | Prevent discoloration | As required |
| Canned | Soften texture, enhance tenderness | 0.1–0.4 |
| Jellies & jam | Controls gel strength | As required |
| Whey processing | Prevents scale buildup & fouling | As required |
| Lite table syrup | Maintains viscosity | 0.01–0.1 |
| Gums | | |
| Carrageenan, others | Gel strength control | As required |

Industrial Applicability

The high potassium polyphosphate can be used in beverages, especially in low sodium beverages as well as in isotonic beverages. In addition, it can be used to produce a reduced sodium food in any other food application in which phosphates are normally used.

The advantageous properties of this invention can be observed by reference to the following examples, which illustrate, but do not limit, the invention.

Throughout this specification and claims, all parts and percentages are by weight unless otherwise indicated.

EXAMPLES

Examples 1–9

These examples illustrate preparation of polyphosphates with a high potassium to sodium ratio. The ingredients indicated in Table 1 were mixed together in a ceramic or alumina vessel, lightly covered, and heated in a muffle furnace. The heating conditions are indicated in the Table.

TABLE 1[a]

| Exp. No. | MKP[b] | MSP[c] | 50% KOH | Distilled Water | Furnace (° C./hr) |
|---|---|---|---|---|---|
| 1 | 75 | 0 | 13 | 10 | 175/1 780/1 |
| 2 | 25 | 35 | 7 | 20 | 175/2 275/2 750/0.75 |
| 3 | 50 | 20 | 7 | 20 | 175/2 275/2 750/1 |
| 4 | 50 | 12.7 | 6.9 | 20 | 275/2 750/1 |
| 5 | 50 | 10.2 | 6.9 | 20 | 275/2 750/1 |

[a]All amounts are in grams.
[b]Food grade monopotassium phosphate ($KH_2PO_4$).
[c]Food grade monosodium phosphate ($NaH_2PO_4$).

The products were analyzed as shown in Table 2 using methods generally employed by those skilled in the art. The amount of water-insoluble material was determined gravimetrically. The quantity of long chain polyphosphates (n>3) was determined by separation of the phosphate species by ion exchange followed by hydrolysis. The orthophosphates thus formed are combined with specific reagents to produce a molybdenum blue complex, which is quantified using a colormiter. Total $P_2O_5$ was determined by titration after a hydrolysis step.

Example 1, which does not contain any added sodium, possessed a very high level of soluble material and a low level of polyphosphates (n>3). However, as shown in Example 2, 3, and 4, in which both sodium and potassium are included in the product, properties desirable for incorporation into beverages are obtained. Beyond a certain ratio of potassium to sodium e.g., greater than 4, the amount of water-insoluble material in the product becomes too high to be acceptable for beverage preparations. Excess water-insoluble material in beverages produces undesirable sediment formation.

TABLE 2

| Example No. | K/Na (mol) | % Water Insolubles | % Polyphosphates[a] (n > 3) | % $P_2O_5$ | (K,Na)/P (mol) | pH[b] |
|---|---|---|---|---|---|---|
| 1 | — | 60.2–68.4 | ~31 | 55.4–56 | 1.155–1.161 | — |
| 2 | 0.84 | 0.2 | ~92 | 62 | 1.109 | 7.2 |
| 3 | 2.8 | ~2.5 | ~92 | 59.9 | 1.103 | 7.2 |
| 4 | 3.8 | 4.4 | ~89 | 57.5 | 1.134 | 7.4 |
| 5 | 5.1 | 6.1 | ~86 | 57.4 | 1.140 | 7.5 |

[a]Water-soluble portion only.
[b]1% solution.

Four additional runs were carried out under the conditions used in Example 3, a K/Na of about 2.3–2.8 and a $P_2O_5$ content of about 60%. All of the products contained very low levels of water-insoluble material. Results are given in Table 3.

TABLE 3

| Example No. | % Water Insolubles | % Polyphosphates[a] (n > 3) | pH (1% soln) |
|---|---|---|---|
| 6 | 2.1 | ~89 | — |
| 7 | 0.61 | — | — |
| 8 | 0.14 | ~89 | — |
| 9 | 0.69 | ~89 | 7.1 |

[a]Water-soluble portion only.

Phosphate species distribution results for the product formed in Example 3 and in Example 6 and for a commercially available food grade water soluble sodium polyphosphate composed of linear chains of metaphosphate units with an average chain length of thirteen are given in Table 4. Detailed phosphate species distribution was determined by ion exchange, as described above, but a more gradual elution gradient was used. The numerical values in each product column represent % of total.

TABLE 4

| Elution peak No.[a] | NaPy[b] | Example 3 | Example 6 |
|---|---|---|---|
| 1 | 0.7 | 0.4 | 0.8 |
| 2 | 2.2 | 2.7 | 3.1 |
| 3 | 3.2 | 2.7 | 3.8 |
| 4 | 2.3 | 1.1 | 1.3 |
| 5 | 7.2 | 4.5 | 5.9 |
| 6 | 4.4 | 6.3 | 9.2 |
| 7 | 6.7 | 4.7 | 5.5 |
| 8 | 4.4 | 3.5 | 4.1 |
| Higher peaks | 68.9 | 74.1 | 66.3 |

[a]Elution peak number does not necessarily correspond to the number of phosphate units.
[b]Commercially available food grade amorphous, water soluble sodium polyphosphate composed of linear chains of metaphosphate units with an average chain length of 13.

The phosphates species distribution for the product formed in Example 3 and in Example 6 is similar to that of the commercially available food grade polyphosphate.

Example 10

This example shows that heating at about 250° C. for 2 hr is not sufficient to produce a phosphate mixture with an average chain length greater than 9. A mixture of 74.4 g of 115% phosphoric acid, 100 g of 50% potassium hydroxide, and 10 g of distilled water was heated at 225° C. for 2 hr. The product contained 0.03% insolubles. Analysis indicated %$P_2O_5$ was 54.12% and the K,Na/P ratio was 0.933. The phosphate distribution was 56.8% orthophosphate (n=1), 27% pyrophosphate (n=2), 10.7% tripolyphosphate (n=3), and 5.5% higher phosphates (n>3).

Having described the invention, we now claim the following and their equivalents.

What is claimed is:

1. A beverage comprising:
   added water;
   about 400 ppm to about 1000 ppm of a preservative; and
   about 100 ppm to about 3000 ppm of a polyphosphate; in which:
   the polyphosphate has the following composition:

$(K,Na)_{(n+2)}O(PO_3)_n$;

the ratio of potassium to sodium is about 0.5 to 3.8;
   the average value of n is greater than 10; and
   at least 85% of the phosphate species comprise more than three phosphate units.

2. The beverage of claim 1 further comprising 0.1 to 40% of fruit juice.

3. The beverage of claim 1 in which the ratio of potassium to sodium is about 1.0 to 3.8.

4. The beverage of claim 1 in which the ratio of potassium to sodium is about 2.4 to 3.6.

5. The beverage of claim 4 in which the (K,Na)/P ratio is about 1.0.

6. The beverage of claim 5 in which the beverage is a non-carbonated beverage that additionally comprises 0.1 to 40% of fruit juice.

7. The beverage of claim 1 comprising in the range of about 300 ppm to 3000 ppm of said polyphosphate.

8. The beverage of claim 1 comprising in the range of about 500 ppm to about 1500 ppm of said polyphosphate.

9. The beverage of claim 1 further comprising in the range of about 0.02% to about 0.25% tea solids.

10. The beverage of claim 1 further comprising additional vitamins.

11. The beverage of claim 1 further comprising additional minerals.

12. The beverage of claim 1 further comprising at least one preservative.

13. The beverage of claim 1 further comprising at least one of a gum, an emulsifier and an oil.

14. The beverage of claim 1 wherein said added water has a hardness in the range of about 0 to about 180 ppm.

15. The beverage of claim 1 further comprising a sweetener.

16. The beverage of claim 15 comprising in the range of about 0.1% to about 20% sugar solids by weight of the beverage products.

17. The beverage of claim 16 comprising in the range of about 6% to about 14% sugar solids by weight of the beverage products.

* * * * *

UNITED STATES PATENT AND TRADEMARK OFFICE
CERTIFICATE OF CORRECTION

PATENT NO.     : 6,440,482 B1
DATED          : August 27, 2002
INVENTOR(S)    : Henson et al.

It is certified that error appears in the above-identified patent and that said Letters Patent is hereby corrected as shown below:

Column 1,
Line 33, insert -- be -- after "beverages can"
Line 36, delete "." after "85–105º C"

Column 2,
Line 22, insert -- of -- after "embodiment"

Column 3,
Line 21, delete "," after "monopotassium"
Line 59, delete "." after "750º C"
Line 60, delete "." after "600º C"
Line 62, delete "." after "780º C"

Column 5,
Line 63, delete "in the form of" after "carbohydrates"

Column 6,
Line 10, delete "." after "40º F" and delete "." after "4º C"

Column 8,
Line 22, should read -- level of water in-soluble material --

Column 9,
Line 27, delete "." after "250º C"
Line 31, should read -- 255º C for 2 hr. --

Signed and Sealed this

Twenty-ninth Day of April, 2003

JAMES E. ROGAN
*Director of the United States Patent and Trademark Office*